United States Patent [19]

Rahman

[11] Patent Number: 4,859,024
[45] Date of Patent: Aug. 22, 1989

[54] OPTICAL FIBER CABLE WITH TAMPERING DETECTING MEANS

[75] Inventor: Mujib Rahman, Columbia, S.C.

[73] Assignee: Pirelli Cable Corporation, Florham Park, N.J.

[21] Appl. No.: 166,255

[22] Filed: Mar. 10, 1988

[51] Int. Cl.⁴ .............. G02B 6/44; H01J 5/16; H01B 7/02; G08B 13/20
[52] U.S. Cl. .............. 350/96.23; 350/96.10; 250/227; 250/231 P; 174/25 G; 174/70 R; 340/541; 340/544; 340/632
[58] Field of Search ............... 350/96.23, 96.32, 96.33, 350/96.10; 250/227, 231 P; 174/25 G, 26 G, 70 R; 340/500, 541, 544, 591, 592, 632

[56] References Cited

U.S. PATENT DOCUMENTS

| | | | |
|---|---|---|---|
| 1,855,321 | 4/1932 | Shackleton | 340/536 |
| 3,259,892 | 7/1966 | Winckelmann | 340/242 |
| 3,862,349 | 1/1975 | Watts | 174/26 G X |
| 3,865,967 | 2/1975 | Pritchett | 174/11 |
| 4,000,416 | 12/1976 | Goell | 350/96.33 |
| 4,112,247 | 9/1978 | Dembiak et al. | 174/16 R |
| 4,132,854 | 1/1979 | Kemeny et al. | 174/26 G X |
| 4,436,368 | 3/1984 | Keck | 350/96.33 |
| 4,581,478 | 4/1986 | Pugh et al. | 174/25 G X |
| 4,720,164 | 1/1988 | Oestreich | 350/96.23 |
| 4,755,020 | 7/1988 | Willis et al. | 174/25 G X |
| 4,778,248 | 10/1988 | Arzur et al. | 350/96.23 |

FOREIGN PATENT DOCUMENTS

| | | | |
|---|---|---|---|
| 3424808 | 1/1986 | Fed. Rep. of Germany | 350/96.23 X |
| 55-163503 | 12/1980 | Japan | 350/96.23 X |
| 62-98312 | 5/1987 | Japan | 350/96.23 X |
| 0006364 | 1/1980 | United Kingdom | 350/96.23 X |
| 2128649 | 5/1984 | United Kingdom | 340/544 X |
| 2166886 | 5/1986 | United Kingdom | 350/96.23 X |

OTHER PUBLICATIONS

Research Discl., "Double-Pressurised Optical Fibre Cable" Sep. 1978, No. 173, pp. 29-30.

*Primary Examiner*—William L. Sikes
*Assistant Examiner*—Brian M. Healy
*Attorney, Agent, or Firm*—Brooks Haidt Haffner & Delahunty

[57] ABSTRACT

An optical fiber cable with optical fibers surrounded by a first gas blocking layer which is surrounded by a second gas blocking layer spaced from the first layer so as to provide longitudinal gas flow channels between the first and second layers. The channels are filled with a gas under a pressure above atmospheric pressure so that when the second layer is punctured, there is a gas flow and/or gas pressure drop indicating such puncturing and hence, if caused by tampering, the fact of tampering. Also, devices for indicating the gas flow and/or pressure drop and alarms and/or signal transmission terminating apparatus responsive to such devices.

16 Claims, 3 Drawing Sheets

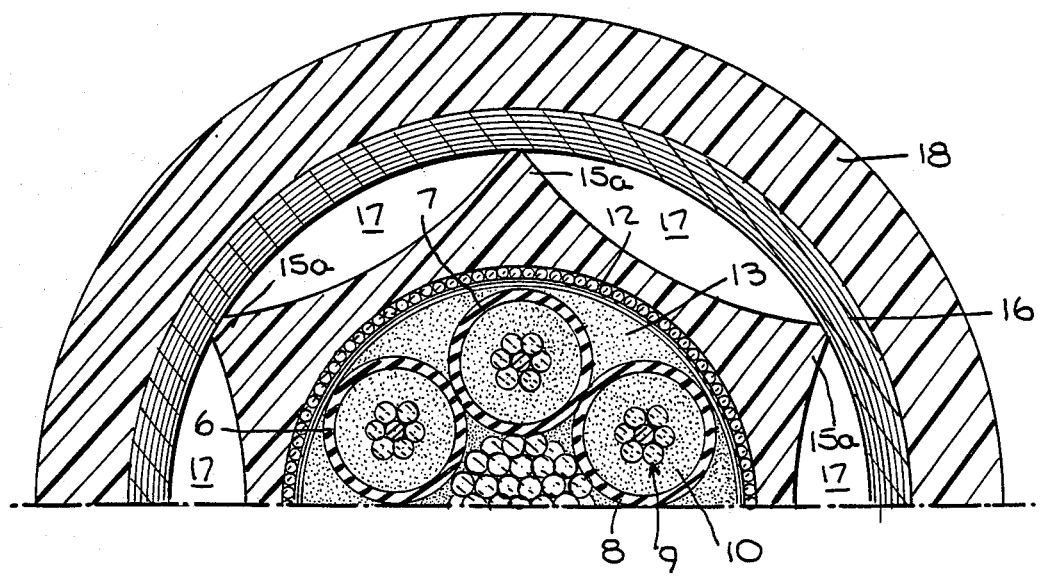
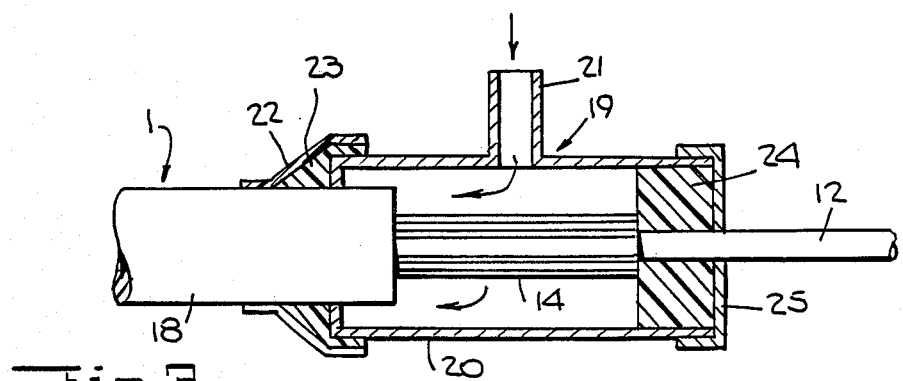
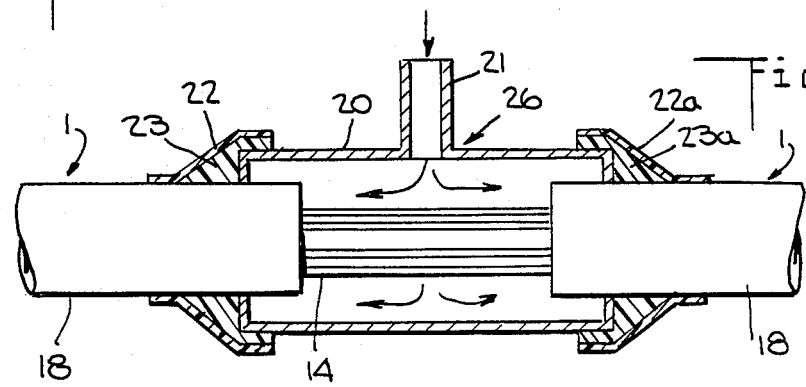

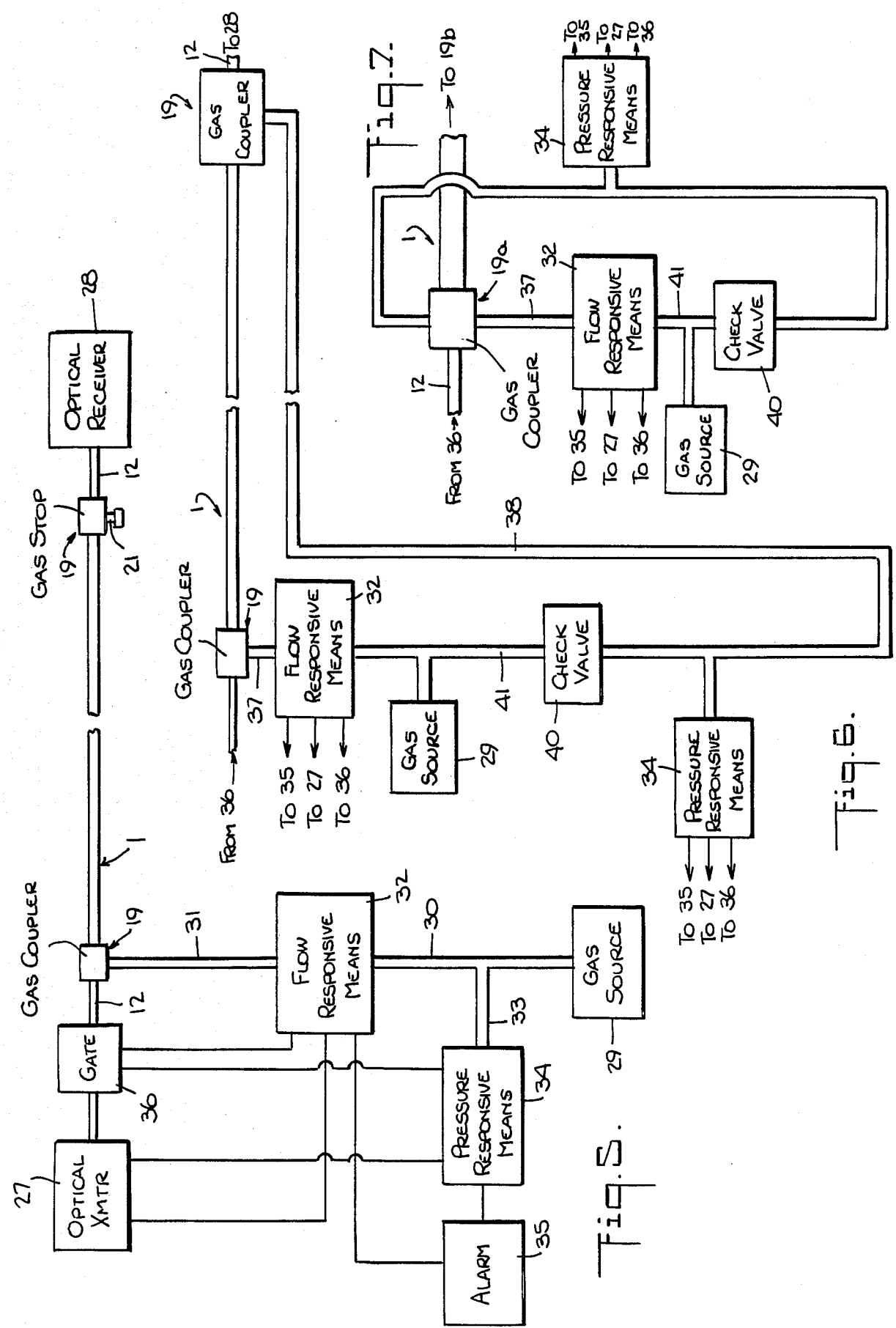

OPTICAL FIBER CABLE WITH TAMPERING DETECTING MEANS

This invention relates to an optical fiber cable with means for detecting tampering with the cable such as by unauthorized access to the optical fibers within the cable by penetration of the cable sheath.

Communication signals sent by way of optical fibers need to be protected with respect to unauthorized access thereto, particularly if such communications are of a classified, confidential or proprietary nature. It is known in the art that such communications can be monitored relatively simply by placing a coupler near, or in contact with, an optical fiber without any observable indication thereof at the sending or receiving stations.

It is known in the electrical cable art to supply gas under pressure to a cable with electrical conductors and to determine pressure leaks by altering the resistance between a pair of electrical conductors in response to a leak or by using manometers connected to various points in the cable by tubes. See, for example, U.S. Pat. Nos. 1,855,321; 3,259,892; 3,865,967 and 4,112,247. However, the gas supplied either surrounds the conductors or is supplied inwardly of the conductors.

Normally, optical fibers are surrounded by a viscous fluid, such as a petroleum jelly, for various reasons, such as physical and moisture protection, and therefore, the optical fibers cannot also be surrounded by a gas. Also, optical fibers are damaged by hydrogen and the fibers cannot be subjected to a gas containing hydrogen.

In addition, the supply of gas inwardly of the optical fibers is ineffective to indicate tampering because unless the optical fibers are also in the gas atmosphere, penetration of the cable sheath for tampering purposes is not indicated by a change in gas pressure or flow.

While manometers connected by tubes to various parts of an electrical cable are useful in determining the location of a gas leak, determining the location of the leak is not essential in detecting tampering, and the inclusion of tubes in a cable complicates the structure and manufacture thereof.

For these reasons, the expedients adopted for the detection of gas leaks in electrical cables are either inapplicable or unsatisfactory for the detection of tampering with optical fiber cables.

One object of the invention is to permit detection of tampering with a filled optical fiber cable without exposing the optical fibers to a gas used in such detection and without requiring a complicated cable structure.

In accordance with the preferred embodiment of the invention, the optical fibers are loosely contained in one or more tubes filled with a viscous fluid and the tube or tubes are surrounded by a first gas flow blocking layer. If there are more than one such tube, the spaces intermediate the tubes are filled with a viscous fluid. The first gas flow blocking layer is surrounded by a second gas flow blocking layer radially spaced from the first layer and one of the layers has longitudinally extending ribs extending to the other layer to provide longitudinally extending gas ducts or channels intermediate the first and second gas flow blocking layers. The ducts are filled with a gas under pressure, and the gas pressure and/or flow in the ducts is monitored to provide an indication of a penetration of the second gas flow blocking layer which modifies the gas pressure or flow. A change in the gas pressure or flow is used to operate an alarm and/or to interrupt the transmission of signals over the fibers.

Other objects and advantages of the present invention will be apparent from the following detailed description of the presently preferred embodiments thereof, which description should be considered in conjunction with the accompanying drawings in which:

FIG. 2 is a fragmentary, transversal cross-section of an alternative embodiment of the invention;

FIG. 3 illustrates schematically, and partially in longitudinal cross-section, a gas coupler for supplying gas to an end of the cable of the invention in association with an end of the cable of the invention;

FIG. 4 is similar to FIG. 3 but illustrates a gas coupler for supplying gas to an intermediate portion of a cable of the invention;

FIG. 5 is a schematic diagram illustrating an optical fiber signal transmission system employing a cable of the invention and having means responsive to penetration of the outer gas flow blocking layer; and FIGS. 6 and 7 are similar to FIG. 5 but illustrate alternative embodiments of the system shown in FIG. 5.

Figure 1:
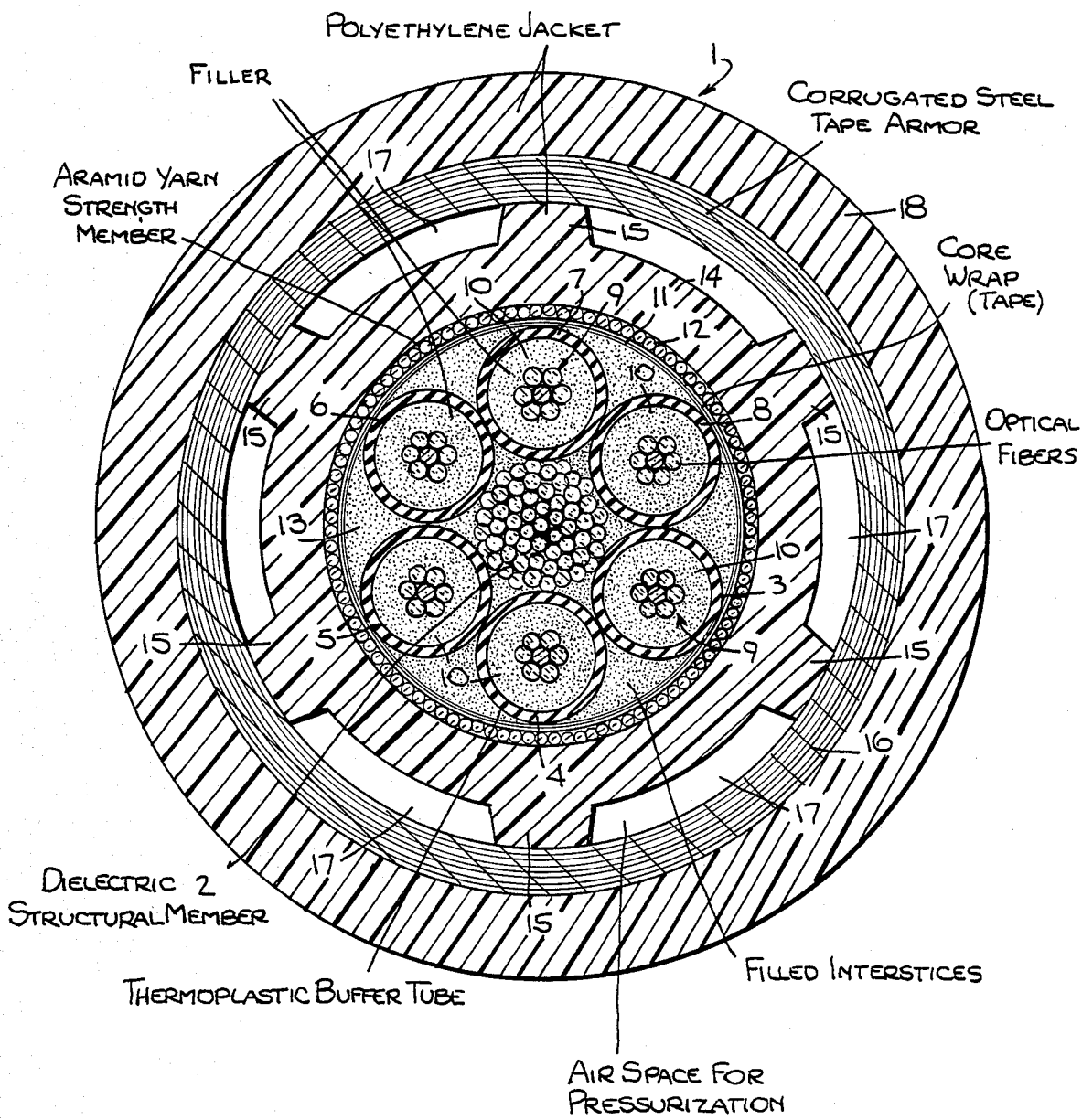
FIG. 1 is a transverse cross-section of a preferred embodiment of a filled optical fiber cable of the invention.

The embodiment of the cable 1 of the invention illustrated in FIG. 1 comprises a central structural member 2 for withstanding tension loads on the cable 1. The member 2 can be made of materials conventionally used for such purpose in optical fiber cables and may, for example, be made of metal wires, or of aramid or glass fibers, either stranded or not stranded.

The cable 1 illustrated in FIG. 1 has six buffer tubes 3–8 formed of a thermoplastic material such as polyethylene, nylon or fluorocarbon resins. Each buffer tube 3–8 loosely surrounds six optical fibers 9 of a conventional type which can be coated fibers with or without a protective layer therearound. Although six buffer tubes each containing six optical fibers has been shown, the number of tubes and the number of optical fibers in each tube may be greater or lesser.

Preferably, any spaces within the buffer tubes 3–8 not occupied by the optical fibers 9 are filled with a conventional viscous filler 10 such as a filler based on petroleum, e.g. petroleum jelly, or silicone oil. Preferably, such filler 10 is thixotropic.

The buffer tubes 3–8 are wrapped with a layer or layers 11 of helically wound plastic tape. The layer 11 has a strength member 12 therearound which can, for example, be aramid yarn threads helically wound or in the form of a braid.

Preferably, any spaces within the layer 11 not occupied by the buffer tubes 3–8, and the central member 2 are filled with a filler 13 which can be the same as the filler 10 but need not be thixotropic.

The strength member 12 is surrounded by a first gas blocking layer 14 having a plurality of ribs 15 extending outwardly therefrom and engaging the inner surface of an armoring layer 16 of helically wrapped, corrugated steel tape. The blocking layer 14 can be made of a plastic such as polyethylene. In certain applications, such as when the gas flow is in opposite directions in the ducts 17 between the ribs 15, the outer ends of the ribs form a substantially gas-tight seal with the layer 16 so as to substantially prevent gas leakage between the gas ducts 17. Although six ribs 15 have been shown, it is apparent that the number of ribs 15 may be greater or lesser in number.

The armoring layer 16 is surrounded by a second gas blocking layer or sheath 18 made of a plastic such as polyethylene, polyvinylchloride, fluoropolymer, etc.

From a consideration of the construction of the cable of the invention illustrated in FIG. 1, it will be noted that a plurality of longitudinally extending gas ducts 17 are provided between the first gas blocking layer 14 and the second gas blocking layer 18 and that gas, when supplied to the ducts 17, is prevented from contacting elements, including the optical fibers 9 inwardly of the layer 14.

If desired, the second gas blocking layer can be intermediate the armoring layer 16 and the first gas blocking layer 14 while retaining the sheath 18. In such case, the ribs 15 will function as described, but if desired, the ribs 15 extending from the layer 14 may be replaced by corresponding ribs extending from the gas blocking layer intermediate the armoring layer 16 and the layer 14.

FIG. 2 illustrates an alternative configuration of the ribs 15, the modified ribs being designated by the reference numeral 15a. Of course, it will be apparent that the ribs may have configurations other than those illustrated in FIGS. 1 and 2.

In addition, it will be apparent to those skilled in the art that the invention is applicable to optical fiber cables having layers in addition to those illustrated in FIGS. 1 and 2 or which omit one or more of the layers illustrated in FIGS. 1 and 2 provided that there are spaced inner and outer gas blocking layers around the optical fibers having gas receiving ducts therebetween. For example, if the filler 13 is omitted, but the buffer tubes 3-8 contain the filler 10, are sufficiently rigid and are substantially gas impervious, the ribs 15 may be omitted, the armoring 16 engaging the layer 14, and the sheath 18 need not be substantially gas impervious. In this case, the gas receiving ducts are the spaces intermediate the tubes 3-8 and intermediate such tubes and the central member 2.

Also, the principles of the invention are applicable to other optical fiber components which it is desired to protect with respect to unauthorized penetration.

In use, the cables of the invention have a gas, such as air, nitrogen, etc., in the ducts 17 at a pressure above atmospheric pressure, e.g. at a pressure of 7-10 psig. When the outer gas blocking layer, i.e. the layer 18 or a corresponding outer gas blocking layer is pierced, the penetration of such layer is indicated by gas flow and/or gas pressure drop. The gas under pressure may be supplied to the ducts 17 in various ways, and FIGS. 3 and 4 illustrate types of apparatus which can be employed.

FIG. 3 illustrates a gas coupler 19 which can be used at the end of a cable 1 for supplying gas under pressure to the ducts 17. The coupler 19 has a cylindrical metal body 20 with a pipe or nipple 21 extending therefrom and through which gas under pressure is supplied from a suitable source, e.g. a gas tank.

The sheath 18 of the cable 1 has a gas tight connection with the body 20, such as by means of a heat shrinkable tube 22 engaging the sheath 18 and the body 20 and surrounding a mass of sealing compound 23. A portion of the cable 1 within the body 20 has sheath 18 and the armoring 16 removed therefrom to expose the inner gas blocking layer 14 and hence, the ducts 17. Another portion of the cable 1 has the layers outside the strength member 12 removed therefrom and surrounded by a plastic plug or collar 24 which forms a gas tight seal with the layer 14 and the member 12 and with the body 20. The right end of the body is also closed by a metal cap 25 which aids in retaining the plug 24 in place.

Accordingly, when gas under pressure is supplied to the pipe 21, it flows into the ducts 17.

If, as described hereinafter, an end of the optical fiber cable is to be blocked, the coupler 19 may be used for such purpose by blocking the pipe 21 or omitting the pipe 21.

If, as described hereinafter, gas is circulated in one direction in some of the ducts 17 and is circulated in the opposite direction in others of the ducts 17, the body 20 may be provided with internal, axially extending dividers, in an obvious manner which separate the gas flow into said some of the ducts from the gas flow out of said others of said ducts. In such event, an additional pipe 21 may be provided to remove gas from one or more of the compartments provided by the dividers.

If it is desired to supply the gas under pressure to an intermediate portion of the cable 1, the gas coupler 26, which is similar to the gas coupler 19, can be used. The coupler 26 differs from the coupler 19 in that the plug 24 and the cap 25 of the coupler 19 are replaced by sealing means 22a and 23a corresponding to the sealing means 22 and 23 described in connection with FIG. 3. The gas coupler 26 may be modified in the manner described in connection with the coupler 19.

FIG. 5 is a schematic diagram of an optical fiber signal transmission system incorporating a cable 1, an optical transmitter 27, an optical receiver 28 and various devices for detecting and indicating gas pressure drop and gas flow.

Gas under pressure, e.g. a pressure of 7-10 psig, is supplied from a gas source 29 to the ducts 17 of the cable 1 by way of pipes or tubes 30 and 31, a conventional flow responsive means 32 which provides an electrical output signal when gas flows therethrough, and a gas coupler 19 described hereinbefore. A pipe or tube 33 supplies gas from the line 30 to a conventional gas pressure responsive means 34 which provides an electrical output when the pressure of the gas supplied thereto drops below a predetermined value. Although either the flow responsive means 32 or the pressure responsive means 34 can be omitted, for better assurance of a response to penetration of the cable 1, both are included.

Both the flow responsive means 32 and the pressure responsive means 34 are shown connected to an audio or visual alarm 35 of a conventional type, to the optical transmitter 27 and to a conventional electrically operable, optical gate 36. However, if desired, the connection of the means 32 and 34 to any two of 27, 35 and 36 can be omitted.

In the system illustrated in FIG. 5, the gas in the ducts 17 is static after the ducts 17 have been filled, the gas coupler 19 having the nipple 21 blocked as described hereinbefore to act as a gas stop. Whenever the layers of the cable 1 outwardly of the ducts 17 are penetrated, gas escapes from the one or more of the ducts 17 which causes a flow of gas from the source 29 into the ducts 17, a drop in gas pressure at the pipe 37 and electrical outputs from the flow responsive means 32 and the pressure responsive means 34.

An electrical output from either the means 32 or the means 34 will activate the alarm 35, will deenergize the optical transmitter, such as by opening its power circuit and will close the gate 36. Deenergization of the transmitter 27 or closing of the gate 36 will prevent further supply of optical signals to the cable 1, and if desired, only deenergization of the transmitter 27 or operation of the gate 36 may be used, the gate 36 being omitted if deenergization of the transmitter 27 is used.

FIG. 6 illustrates an alternative optical fiber communication system in which the gas circuit is a loop circuit. In this embodiment, gas flows from the source 29 by way of pipe 37 to the first, near end coupler 19, then through the ducts 17 to the second, far end coupler and returns to a check valve 40 by way of a pipe 38.

The gas flow loop is completed by a pipe 41 extending from the check valve 40 which prevents gas from flowing in the direction opposite to the one described.

The pressure responsive means 34 and the flow responsive means 32 act in the manner previously described.

FIG. 7 schematically illustrates an alternative embodiment of the invention in which the pipe 38 replaced by some of the ducts 17 and the gas coupler 19 is modified as described hereinbefore. Thus, some of the ducts 17 are used to permit flow from the modified coupler 19a to the opposite coupler 19b, like coupler 19a, and the gas returns to the coupler 19a by others of the ducts 17, the gas from such others of the ducts 17 flowing from the coupler 19a to the check valve 40 and returning to the pipe 37 by way of the pipe 42. Otherwise, the operation of the system shown in FIG. 7 is as described in connection with FIG. 6.

It will be apparent from the description of embodiments of the invention that the optical fibers are isolated from the gas supplied to the cable 1 and that in the event that the cable 1 is punctured as far as the ducts 17, gas escaping from the ducts 17 will reduce the gas pressure at the pressure responsive means 34 and increase the gas flow at the flow responsive means 32 which, dependent upon the devices associated with the means 34 and 32, will operate the alarm 35, deenergize the optical transmitter 27 and close the gate 36 providing an obvious indication of unauthorized access to interior of the cable 1.

Although the invention has been described in connection with indicating unauthorized access to an optical fiber cable, it will be apparent to those skilled in the art that the principles of the invention are applicable to optical fiber cables other than the one illustrated and to optical fiber cable components such as repeaters, couplers, junctions, etc.

Although preferred embodiments of the present invention have been described and illustrated, it will be apparent to those skilled in the art that various modifications may be made without departing from the principles of the invention.

I claim:

1. An optical fiber cable comprising at least one optical fiber extending lengthwise of said cable, a first substantially gas impermeable layer encircling said optical fiber and a second substantially gas impermeable layer encircling said first substantially gas impermeable layer, a viscous filler filling any otherwise empty spaces within said first layer and said second layer having at least a portion of its inner surface spaced from the outer surface of said first layer to provide at least one gas receiving duct intermediate said first layer and said second layer which extends lengthwise of said cable.

2. An optical fiber cable as set forth in claim 1 wherein said optical fiber is loosely received within a buffer tube of plastic material having any otherwise empty spaces therein filled with a viscous filler and wherein said second layer is a layer of plastic material encircling said buffer tube.

3. An optical fiber cable as set forth in claim 1 wherein there are a plurality of optical fibers and a plurality of buffer tubes of plastic material disposed around the least one optical fiber loosely received therein and having any otherwise empty spaces therein filled with a filler and wherein said first layer is a layer of plastic material encircling said plurality of buffer tubes.

4. An optical fiber cable as set forth in claim 3 wherein one of said first layer and said second layer has a plurality of ribs extending therefrom and from said one layer toward the other said layer to provide a plurality of longitudinally extending gas receiving ducts intermediate said first layer and said second layer.

5. An optical fiber cable as set forth in claim 4 wherein said second layer is a layer of plastic material and further comprising a layer of metal armor encircling said first layer and intermediate said first layer and said second layer.

6. An optical fiber cable as set forth in claim 5 further comprising a central longitudinally extending strength member disposed at said axis of said cable, each of said plurality of buffer tubes being disposed adjacent to other buffer tubes and said plurality of buffer tubes being disposed around said central strength member.

7. An optical fiber cable as set forth in claim 6 further comprising at least a buffer tube wrapping layer encircling said plurality of buffer tubes and intermediate said plurality of buffer tubes and said first layer.

8. An optical fiber cable system comprising:
an optical fiber cable, said cable having at least one optical fiber extending lengthwise of said cable, a first substantially gas impermeable layer encircling said optical fiber and a second substantially gas impermeable layer encircling said first substantially gas impermeable layer, a viscous filler filling any otherwise empty spaces within said first layer and said second layer having at least a portion of its inner surface spaced from the outer surface of said first layer to provide at least one gas receiving duct intermediate said first layer and said second layer which extends lengthwise of said cable;
gas supply means connected to said duct for the supply of gas at a pressure above atmospheric pressure to said duct; and
detecting means connected to said duct and responsive to the gas therein for detecting a flow of gas through said second layer.

9. An optical fiber cable system as set forth in claim 8 wherein said detecting means is gas flow measuring means.

10. An optical fiber cable system as set forth in claim 9 further comprising alarm means connected to said gas flow measuring means and responsive thereto upon detection of gas flow in said duct by said flow measuring means.

11. An optical fiber cable system as set forth in claim 8 wherein said detecting means is gas pressure measuring means.

12. An optical fiber cable system as set forth in claim 11 further comprising alarm means connected to said gas pressure measuring means and responsive thereto upon a reduction of gas pressure in said duct.

13. An optical fiber cable system comprising:
an optical fiber cable, said cable having at least one optical fiber extending lengthwise of said cable, a first substantially gas impermeable layer encircling said optical fiber and a second substantially gas impermeable layer encircling said first substantially gas impermeable layer, said second layer having at least a portion of its inner surface spaced from the outer surface of said first layer to provide at least one gas receiving duct intermediate said first layer and said second layer which extends lengthwise of said cable;

gas supply means connected to said duct for the supply of gas at a pressure above atmospheric pressure to said duct;

gas flow measuring means connected to said duct and responsive to the gas therein for detecting a flow of gas through said second layer; and alarm means connected to said flow measuring means and responsive thereto upon detection of gas flow in said duct by said flow measuring means.

14. An optical fiber cable system comprising:

an optical fiber cable, said cable having at least one optical fiber extending lengthwise of said cable, a first substantially gas impermeable layer encircling said optical fiber and a second substantially gas impermeable layer encircling said first substantially gas impermeable layer, said second layer having at least a portion of its inner surface spaced from the outer surface of said first layer to provide at least one gas receiving duct intermediate said first layer and said second layer which extends lengthwise of said cable;

gas supply means connected to said duct for the supply of gas at a pressure above atmospheric pressure to said duct;

gas pressure measuring means connected to said duct and responsive to the gas therein for detection a flow of gas through said second layer; and alarm means connected to said gas pressure measuring means and responsive thereto upon a reduction of gas pressure in said duct.

15. An optical fiber cable system comprising:

an optical fiber cable, said cable having at least one optical fiber extending lengthwise of said cable, a first substantially gas impermeable layer encircling said optical fiber and a second substantially gas impermeable layer encircling said first substantially gas impermeable layer, said second layer having at least a portion of its inner surface spaced from the outer surface of said first layer to provide at least one gas receiving duct intermediate said first layer and said second layer which extends lengthwise of said cable;

gas supply means connected to said duct for the supply of gas at a pressure above atmospheric pressure to said duct;

gas flow measuring means connected to said duct and responsive to the gas therein for detecting a flow of gas through said second layer;

an optical transmitter connected to said optical fiber for supplying signal energy thereto; and means for stopping the supply of signal energy to said optical fiber by said optical transmitter, the last-mentioned said means being connected to said gas flow measuring means and being responsive thereto for stopping the supply of signal energy to said optical fiber upon detection of gas flow in said duct by said flow measuring means.

16. An optical fiber cable system comprising:

an optical fiber cable, said cable having at least one optical fiber extending lengthwise of said cable, a first substantially gas impermeable layer encircling said optical fiber and a second substantially gas impermeable layer encircling said first substantially gas impermeable layer, said second layer having at least a portion of its inner surface spaced from the outer surface of said first layer to provide at least one gas receiving duct intermediate said first layer and said second layer which extends lengthwise of said cable;

gas supply means connected to said duct for the supply of gas at a pressure above atmospheric pressure to said duct;

gas pressure measuring means connected to said duct and responsive to the gas therein for detecting a flow of gas through said second layer;

an optical transmitter connected to said optical fiber for supplying signal energy thereto; and means for stopping the supply of signal energy to said optical fiber by said optical transmitter, the last-mentioned said means being connected to said gas pressure measuring means and being responsive thereto for stopping the supply of signal energy to said optical fiber upon a reduction of gas pressure in said duct.

* * * * *

UNITED STATES PATENT AND TRADEMARK OFFICE
CERTIFICATE OF CORRECTION

PATENT NO. : 4,859,024

DATED : August 22, 1989

INVENTOR(S) : Rahman

It is certified that error appears in the above-identified patent and that said Letters Patent is hereby corrected as shown below:

Col. 6, line 6, after "the" insert --longitudinal axis of said cable, each said buffer tube having at--;

Col. 7, line 35, "detection" should read --detecting--.

Signed and Sealed this

Fourth Day of September, 1990

Attest:

HARRY F. MANBECK, JR.

*Attesting Officer*   Commissioner of Patents and Trademarks